United States Patent
Kwan

(10) Patent No.: US 7,852,058 B2
(45) Date of Patent: *Dec. 14, 2010

(54) POWER SUPPLY REGULATOR WITH DIGITAL CONTROL

(75) Inventor: Tom Kwan, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/685,433

(22) Filed: Jan. 11, 2010

(65) Prior Publication Data

US 2010/0109632 A1     May 6, 2010

Related U.S. Application Data

(63) Continuation of application No. 11/110,008, filed on Apr. 20, 2005, now Pat. No. 7,649,345.

(60) Provisional application No. 60/583,997, filed on Jun. 29, 2004.

(51) Int. Cl.
    *G05F 1/00* (2006.01)
(52) U.S. Cl. ............................. 323/283; 323/282
(58) Field of Classification Search ............... 323/283
    See application file for complete search history.

(56) References Cited

U.S. PATENT DOCUMENTS 6,005,377 A * 12/1999 Chen et al. ............... 323/283
6,194,883 B1 * 2/2001 Shimamori ............... 323/283
6,911,808 B1 * 6/2005 Shimamori ............... 323/283
6,933,709 B2 * 8/2005 Chapuis ................... 323/282
6,956,360 B2 * 10/2005 Matsuura et al. ......... 323/283
7,649,345 B2 * 1/2010 Kwan ...................... 323/283
2002/0125870 A1 * 9/2002 Mitamura et al. ......... 323/283

* cited by examiner

*Primary Examiner*—Bao Q Vu
*Assistant Examiner*—Jue Zhang
(74) *Attorney, Agent, or Firm*—McAndrews, Held & Malloy, Ltd.

(57) ABSTRACT

An integrated circuit and method in an integrated circuit for providing electrical power utilizing digital power regulation. Various aspects of the present invention provide an integrated circuit comprising a power supply module that outputs electrical power at an output voltage level. An error determination module may receive a power supply reference signal and a signal indicative of the output voltage level and output a power supply error signal. A digital controller module may receive the power supply error signal, digitally process the power supply error signal, and output a power supply control signal. A power output-monitoring module may monitor the electrical power output from the power supply module and output the signal indicative of the output voltage level. The power supply module may receive the power supply control signal and output the electrical power based, at least in part, on the power supply control signal.

32 Claims, 5 Drawing Sheets

POWER SUPPLY REGULATOR WITH DIGITAL CONTROL

CROSS-REFERENCE TO RELATED APPLICATIONS/INCORPORATION BY REFERENCE

This patent application is a continuation of U.S. patent application Ser. No. 11/110,008, filed on Apr. 20, 2005, which makes reference to, claims priority to and claims benefit from U.S. Provisional Patent Application 60/583,997, filed Jun. 29, 2004, and titled "POWER SUPPLY REGULATOR WITH DIGITAL CONTROL". The contents of each of the aforementioned patent applications are hereby incorporated herein by reference in their entirety.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

Electrical circuits generally receive electrical power from power supply circuitry. Such power supply circuitry may consist of a variety of active and/or passive electrical components. Such power supply circuitry, or portions thereof, may also reside in an integrated circuit.

In power supply circuitry, power supply regulators generally attempt to provide a stable source of electrical power. Such power supply regulators typically utilize analog control loops, which are implemented with various analog power regulation components.

In many electrical circuits, integrated circuit and/or circuit board space constraints are relatively tight. Typical power supply integrated circuits inefficiently utilize circuit and/or circuit board space.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide an integrated circuit and a method in an integrated circuit for providing electrical power utilizing digital power regulation, substantially as shown in and/or described in connection with at least one of the figures, as set forth more completely in the claims. These and other advantages, aspects and novel features of the present invention, as well as details of illustrative aspects thereof, will be more fully understood from the following description and drawings.

DETAILED DESCRIPTION OF THE INVENTION

Figure 1:
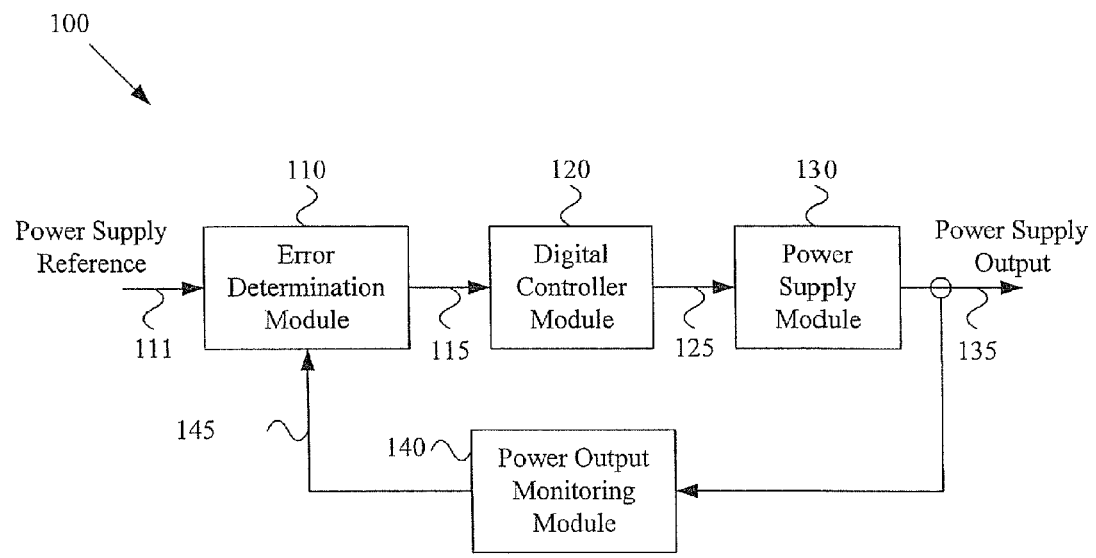
FIG. 1 is a block diagram comprising portions of an exemplary a power supply integrated circuit, in accordance with various aspects of the present invention.

FIG. 1 is a block diagram comprising portions of an exemplary power supply integrated circuit 100, in accordance with various aspects of the present invention. The exemplary circuit 100 comprises an error determination module 110, a digital controller module 120, a power supply module 130 and a power output-monitoring module 140.

The error determination module 110 may receive a power supply reference signal 111. The power supply reference signal 111 (or command signal) may comprise any of a variety of characteristics and be generated by any of a variety of sources. The power supply reference signal 111 may, for example and without limitation, comprise a voltage and/or current level reference. The power supply reference signal 111 may generally comprise a reference signal related to any of a large variety of electrical power characteristics. The power supply reference signal 111 may, for example, be fixed or variable. Also for example, the power supply reference signal 111 may be analog or digital. Further for example, the power supply reference signal 111 may be an absolute or relative reference.

The power supply reference signal 111 may, for example, be generated by a source external to the power supply integrated circuit 100 or may be generated by a source internal to the power supply integrated circuit 100. The power supply reference signal 111 may, for example, be generated by a constant-signal generating source or may, for example, be generated by a variable-signal generating source (e.g., based on present operating conditions or needs). Accordingly, the scope of various aspects of the present invention should not be limited by characteristics of a particular power supply reference signal or source thereof.

The error determination module 110 may also receive a signal indicative of output power level 145. For example, the error determination module 110 may receive the signal indicative of output power level 145 from the power output-monitoring module 140, which will be discussed in more detail later. The signal indicative of output power level 145 may comprise information indicative of a level of electrical power (e.g., a voltage level or current level) that is output from the power supply integrated circuit.

The error determination module 110 may output a power supply error signal 115. The power supply error signal 115 may, for example, be based at least in part on the received power supply reference signal 111 and the signal indicative of output power level 145. For example and without limitation, the error determination module 110 may comprise an integrator circuit (e.g., analog or digital) that integrates the difference between the power supply reference signal 111 and the signal indicative of the output power level 145. In such an exemplary scenario, the power supply error signal 115 may be based, at least in part, on the output of such an integrator circuit.

Also for example, the error determination module 110 may comprise multiplication circuitry and/or differential circuitry with which to process the difference between the power supply reference signal 111 and the signal indicative of the output power level 145. In an exemplary scenario, the power supply error signal 115 may be based, at least in part, on proportional-integral-differential ("PID") processing of the power supply reference signal 111 and the signal indicative of the output power level 145.

The error determination module 110 may also comprise circuitry to convert between analog and digital signals. For example, the error determination module 110 may comprise an analog-to-digital converter (e.g., a flash). In an exemplary scenario where the error determination module 110 comprises an analog integrator circuit that outputs an analog error signal indicative of integrated difference, the error determination module 110 may also comprise an A/D converter that converts the analog error signal output from the analog integrator circuit to a digital signal. Continuing the exemplary scenario, the A/D converter may output the power supply error signal 115 in digital form.

In general, the error determination module 110 may comprise any of a variety of signal processing circuitry with which to generate the power supply error signal 115. Accordingly, the scope of various aspects of the present invention should not be limited by characteristics of particular error determination circuitry.

The exemplary circuit 100 may comprise a digital controller module 120. The digital controller module 120 may, for example, be communicatively coupled to the error determination module 110. For example, the digital controller module 120 may receive the power supply error signal 115 output from the error determination module 110 and digitally process the power supply error signal 115 to generate a power supply control signal 125.

The digital controller module 120 may, for example, comprise a digital filter that processes the power supply error signal 115 or a related signal. The digital filter may, for example, comprise any of a variety of digital filters (e.g., a finite impulse response "FIR" filter or an infinite impulse response "IIR" filter, such as, for example, an integrator). Such an exemplary digital filter may be implemented in any of a variety of manners, including software, hardware or a combination thereof.

The digital controller module 120 may also, for example, comprise a sigma delta module. A sigma delta module may, for example, process an input signal characterized by a first number of digital bits and output an output signal that is representative of the input signal, where the output signal is characterized by a second number of digital bits (e.g., where the second number of digital bits is less than the first number of digital bits).

In an exemplary scenario, the digital controller module 120 may comprise a digital filter that receives and processes the power supply error signal 115 from the error determination module 110 and outputs an intermediate power supply control signal based, at least in part, on the power supply error signal 115. The intermediate power supply control signal may, for example, be characterized by a first number of digital bits. Continuing the exemplary scenario, a digital sigma delta module may receive the intermediate power supply control signal from the digital filter and process the intermediate power supply control signal to generate the power supply control signal 125. The power supply control signal 125 may, for example, be characterized by a second number of digital bits that is less than the first number of digital bits.

As mentioned previously, the digital controller module 120 may output a power supply control signal. Such a power supply control signal may comprise any of a large variety of control signal characteristics. For example, the power supply control signal may be a digital signal. The power supply control signal may, for example and without limitation, comprise information related to the control of power supply circuitry. In an exemplary scenario, the power supply control signal may comprise information of a switching duty cycle with which to control power supply switching circuitry. In an exemplary scenario, the power supply control signal may comprise an index or multiplexer control signal that may control selection of a particular switching control signal from a set of predetermined switching control signals.

In general, the digital controller module 120 may receive the power supply error signal 115 output from the error determination module 110 and digitally process the power supply error signal 115 to generate a power supply control signal 125. Accordingly, the scope of various aspects of the present invention should not be limited by characteristics of particular digital control signal processing techniques or by characteristics of a particular power supply error signal 115 or power supply control signal 125.

The exemplary circuit 100 may comprise a power supply module 130. The power supply module 130 may, for example, output electrical power at an output power level (e.g., characterized by an output voltage level). The power supply module 130 may be communicatively coupled to the digital controller module 120 and may receive the power supply control signal 125 or a related signal from the digital controller module 120. For example and without limitation, the power supply module 130 may receive a signal indicative of the power supply control signal 125 (e.g., the power supply control signal 125 or a signal related to the power supply control signal 125) and output electrical power based, at least in part, on the signal indicative of the power supply control signal 125.

The power supply module 130 may comprise any of a variety of power supply circuitry. For example and without limitation, the power supply module 130 may comprise electrical circuitry for a switching power supply. The power supply module 130 may also comprise a module (e.g., a pulse width modulation module) to control operation of the power supply circuitry.

In an exemplary scenario where the power supply module 130 comprises switching power supply circuitry, the power supply module 130 may comprise a pulse width modulation module that controls the duty cycle of various power supply circuitry switches. Continuing the exemplary scenario, the pulse width modulation module may also comprise a multiplexer from which a signal or set of signals characterized by particular duty cycle characteristics may be selected. In such an exemplary scenario, the power supply control signal 125 may comprise information of such a multiplexer signal selection.

In general, the power supply module 130 may receive a signal indicative of the power supply control signal 125 from the digital controller module 120 and output electrical power 135 based, at least in part, on the signal indicative of the power supply control signal 125. Accordingly, the scope of various aspects of the present invention should not be limited by characteristics of a particular power supply control signal, particular power output signal, particular power supply circuitry or particular power supply operating characteristics.

The power supply module 130 may provide electrical power to any of variety of circuits. In an exemplary configuration, the power supply module 130 may comprise switching power supply circuitry that controls voltage and/or current aspects of subsequent LCR circuit operation. For example, the exemplary power supply switching circuitry may drive LCR circuitry in a buck configuration (i.e., a voltage step-down configuration). For example, the switches of the switching power supply circuitry may control current flow through an inductor to apply a particular voltage across a parallel capacitor and load. Alternatively for example, the exemplary power supply switching circuitry may drive LCR circuitry in a boost configuration (i.e., a voltage step-up configuration). Accordingly, the scope of various aspects of the present invention should not be limited by the existence of, or configuration of, particular LCR components.

In an exemplary circuit configuration that comprises an LCR-type circuit, various components of the LCR circuit may be located in a variety of locations relative to the power supply integrated circuit. For example and without limitation, the LCR circuit components may be located external to the power supply integrated circuit. Alternatively for example, at least a portion of the LCR circuit components may be located within the integrated circuit power supply. Accordingly, the scope of various aspects of the present invention should not be limited by characteristics of a particular location for LCR circuit components.

The exemplary circuit 100 may comprise a power output-monitoring module 140. The power output-monitoring module 140 may, for example, be communicatively coupled to the output of the power supply module 130 and monitor various characteristics of the electrical power 135 output from the power supply module 130. The power output-monitoring module 140 may, for example, monitor the electrical power 135 output from the power supply module 130 and output a signal indicative of the level (e.g., voltage and/or current level) of the output electrical power 135.

The power output-monitoring module 140 may monitor characteristics of the output power 135 in any of a variety of manners, and accordingly, the scope of various aspects of the present invention should not be limited by characteristics of a particular manner of monitoring output power characteristics.

As mentioned previously, the error determination module 110 may receive and process a signal indicative of the output power level 135, which the error determination module 110 may receive from the power output-monitoring module 140. The power output-monitoring module 140 may, for example, comprise signal-scaling circuitry to scale a signal indicative of monitored output power 135 characteristics. For example and without limitation, the power output-monitoring module 140 may scale the signal indicative of the output power level 135 so that such a signal bears a desired proportional relationship with the power supply reference signal 111.

For example and without limitation, in an exemplary scenario where the power output-monitoring module 140 monitors voltage level of the output power 135, the signal scaling circuitry may comprise voltage dividing or amplifying circuitry to adjust the scale of a signal indicative of the monitored voltage level.

The exemplary circuit 100 illustrated in FIG. 1 is merely an illustrative circuit shown to provide specific examples of various generally broader aspects of the present invention. Accordingly, the scope of various aspects of the present invention should not be limited by particular characteristics of the exemplary circuit 100.

Figure 2:
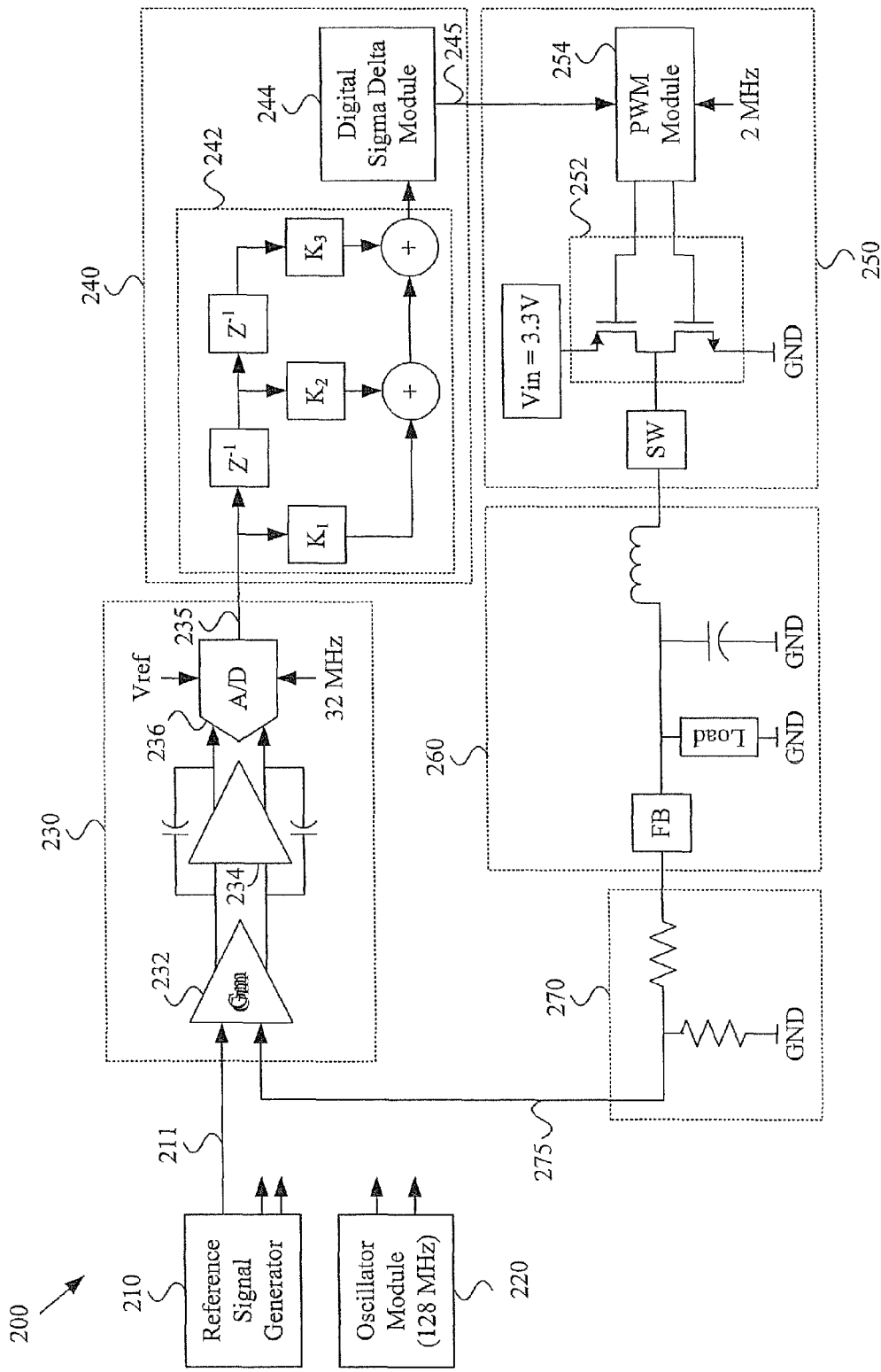
FIG. 2 is a schematic diagram comprising portions of an exemplary power supply integrated circuit, in accordance with various aspects of the present invention.

FIG. 2 is a schematic diagram comprising portions of an exemplary power supply integrated circuit 200, in accordance with various aspects of the present invention. The exemplary integrated circuit 200 may, for example and without limitation, share various characteristics with the exemplary integrated circuit 100 illustrated in FIG. 1 and discussed previously. The exemplary circuit 200 comprises an error determination module 230, a digital controller module 240, a power supply module 250 and a power output-monitoring module 260.

The exemplary circuit 200 may comprise a reference signal generator 210 (e.g., a Bandgap Bias generator). The reference signal generator 210 may, for example, generate a power supply reference signal 211 (e.g., 1.23 V), which the reference signal generator 210 may provide to a subsequent module (e.g., the error determination module 230). The reference signal generator 210 may also, for example, generate various other reference signals (e.g., a reference signal to the A/D converter 236). The reference signal generator 210 (e.g., the exemplary Bandgap Bias generator) may, for example, provide electrical currents that may drive amplifiers or other circuitry. The reference signal generator 210 may generally, for example, comprise a signal source that generates signals having a reliable and accurate value. Accordingly, the scope of various aspects of the present invention should not be limited by characteristics of a particular reference signal generator or reference signal.

The exemplary circuit 200 may comprise an oscillator module 220. The oscillator module 220 may, for example, generate one or more clock signals to be utilized by various components or modules of the exemplary circuit 200. For example and without limitation, the oscillator module 220 may generate a 128 MHz clock signal. The oscillator module 220 may also generate other clock signals for use by various components of the integrated circuit 200. For example, the oscillator module 220 may generate a 32 MHz clock signal to be utilized by the A/D converter 236 and a 2 MHz clock signal to be utilized by the PWM module 254.

The error determination module 230 may, for example and without limitation, share various characteristics with the error determination module 110 of the exemplary circuit 100 illustrated in FIG. 1 and discussed previously. The error determination module 230 may receive a power supply reference signal 211 (e.g., from the reference signal generator 210). The power supply reference signal 211 (or command signal) may comprise any of a variety of characteristics and be generated by any of a variety of sources. The power supply reference signal 211 may, for example and without limitation, comprise a voltage and/or current level reference. The power supply reference signal 211 may generally comprise a reference signal related to any of a large variety of electrical power characteristics. The power supply reference signal 211 may, for example, be fixed or variable. Also for example, the power supply reference signal 211 may be analog or digital. Further for example, the power supply reference signal 211 may comprise an absolute or relative reference.

The power supply reference signal 211 may, for example, be generated by a source external to the power supply integrated circuit 200 or may be generated by a source internal to the power supply integrated circuit 200. The power supply reference signal 211 may, for example, be generated by a constant-signal generating source or may, for example, be generated by a variable-signal generating source (e.g., based on present operating conditions or needs). Accordingly, the scope of various aspects of the present invention should not be limited by characteristics of a particular power supply reference signal or source thereof.

The error determination module 230 may also receive a signal indicative of output power level 275. For example, the error determination module 230 may receive the signal indicative of output power level 275 from the power output-monitoring module 270, which will be discussed in more detail later. The signal indicative of output power level 275 may, for example, comprise information indicative of a level of electrical power (e.g., a voltage level, current level, or other characteristics of electrical power) that is output from the power supply integrated circuit 200.

The error determination module 230 may output a power supply error signal 235. The power supply error signal 235 may, for example, be based at least in part on the received power supply reference signal 211 and the signal indicative of the output power level 275.

The exemplary error determination module 230 illustrated in FIG. 2 may comprise an integrator circuit (e.g., a Gm/C integrator circuit). For example, the error determination module 230 may comprise an amplifier 232 with a gain (e.g., $G_m$) coupled to an analog integrator circuit 234 that amplifies and integrates the difference between the power supply reference signal 211 and the signal indicative of the output power level 275.

The exemplary error determination module 230 may also comprise an A/D converter 236 coupled to the output of the integrator circuit 234. The A/D converter 236 may receive an analog output from the integrator circuit 234 and convert the analog output to a digital signal (e.g., power supply error signal 235). The exemplary A/D converter 236 may, for example, receive a clock signal (e.g., from the oscillator module 220) and a reference voltage (e.g., from the reference signal generator 210). The exemplary error determination module 230 may then output the power supply error signal 235.

In general, the error determination module 230 may comprise any of a variety of signal processing circuitry with which to generate the power supply error signal 235. Accordingly, the scope of various aspects of the present invention should not be limited by characteristics of the signal processing circuitry of the exemplary system 200 illustrated in FIG. 2.

The exemplary circuit 200 may comprise a digital controller module 240. The digital controller module 240 may, for example, share various characteristics with the digital controller module 120 of the exemplary circuit 100 illustrated in FIG. 1 and discussed previously.

The digital controller module 240 may, for example, be communicatively coupled to the error determination module 230. For example, the digital controller module 240 may receive the power supply error signal 235 output from the error determination module 230 and digitally process the power supply error signal 235 to generate a power supply control signal 245.

The exemplary digital controller module 240 illustrated in FIG. 2 may comprise a digital filter 242 that processes the power supply error signal 235 or a related signal. The digital filter 242 may, for example, comprise any of a variety of digital filters (e.g., a finite impulse response "FIR" filter, infinite impulse response "IIR" filter, etc.). The exemplary digital filter 242 illustrated in FIG. 2 comprises a FIR filter that is characterized by the transfer function $k_1+k_2 z^{-1}+k_3 z^{-2}$, where the $k_1$, $k_2$ and $k_3$ coefficients may be a variety of power supply operating scenarios. Such an exemplary digital filter may be implemented in any of a variety of manners, including software, hardware or a combination thereof. Accordingly, the scope of various aspects of the present invention should not be limited by the existence of a digital filter or by characteristics of a particular type of digital filter.

The exemplary digital controller module 240 illustrated in FIG. 2 may also comprise a sigma delta module 244. The sigma delta module 244 may, for example, receive an output signal from the digital filter 242 (or a related signal) and process the received signal to generate the power supply control signal 245. The sigma delta module 244 may, for example, process a received signal that is characterized by a first number of digital bits and output an output signal (e.g., the power supply control signal 245) that is representative of the received signal, where the output signal is characterized by a second number of digital bits. The second number of digital bits may be less than the first number of digital bits. The sigma delta module 244 may also, for example, dither switching control signals to cause a smoothing effect in the output of a subsequent power supply module. Such a digital sigma delta module may also, for example, provide for spreading the spectrum of power supply module switching, thereby reducing or eliminating frequency component spikes in the output of a subsequent power supply module.

In one exemplary scenario, the sigma delta module 244 may receive a 10 or 12-bit signal from the digital filter 242 and process the received signal to generate a 6-bit output signal. In the exemplary scenario, the 6-bit output signal may, for example and without limitation, comprise duty cycle information. Such a signal may, for example, be utilized to control multiplexer circuitry to select from multiple predetermined switching control signals. For example, a 6-bit signal may select from 64 alternative switching control signals with associated switching duty cycles.

In general, the digital controller module 240 may receive the power supply error signal 235 output from the error determination module 230 and digitally process the power supply error signal 235 to generate a power supply control signal 245. Accordingly, the scope of various aspects of the present invention should not be limited by characteristics of the exemplary digital control module 240 illustrated in FIG. 2 and discussed previously. For example, the scope of various aspects of the present invention should not be limited by particular digital control signal processing techniques or apparatus or by characteristics of a particular power supply error signal 235 or power supply control signal 245.

The exemplary circuit 200 may comprise a power supply module 250. The power supply module 250 may, for example and without limitation, share various characteristics with the power supply module 130 illustrated in FIG. 1 and discussed previously.

The power supply module 250 may, for example, output electrical power at an output power level. The power supply module 250 may be communicatively coupled to the digital controller module 240 and may receive the power supply control signal 245 or a related signal from the digital controller module 240. For example and without limitation, the power supply module 250 may receive a signal indicative of the power supply control signal 245 (e.g., the power supply control signal 245 or a signal related to the power supply control signal 245) and output electrical power based, at least in part, on the signal indicative of the power supply control signal 245.

The power supply module 250 may comprise any of a variety of power supply circuitry. In the exemplary circuit 200 illustrated in FIG. 2, the exemplary power supply module 250 may comprise switching power supply circuitry 252. The exemplary power supply module 250 may also comprise a pulse width modulation module 254 to control operation of the switching power supply circuitry 252.

In the exemplary circuit 200 illustrated in FIG. 2, the pulse width modulation module 254 may control the duty cycle of various switches of the switching power supply circuitry 252. In an exemplary scenario, the pulse width modulation module 254 may comprise a multiplexer with which a signal or set of signals characterized by particular duty cycle characteristics may be selected. In such an exemplary scenario, as explained in a previous example, the power supply control signal 245 may comprise information related to multiplexer signal selection. For example, in an exemplary scenario where the pulse width modulation module 254 comprises a multiplexer that selects between 32 switching power supply control signals, each with respective duty cycle characteristics, the power supply control signal 245 may comprise a 6-bit signal to select one of the 32 switching power supply control signals.

In general, the power supply module 250 may receive a signal indicative of the power supply control signal 245 (e.g., the actual power supply control signal 245) from the digital controller module 240 and output electrical power based, at least in part, on the signal indicative of the power supply control signal 245. The scope of various aspects of the present invention should not be limited by characteristics of the exemplary power supply module 250 illustrated in FIG. 2 and discussed previously. Further, the scope of various aspects of the present invention should not be limited by characteristics of a particular power supply control signal, particular power output signal, particular power supply circuitry or particular power supply operating characteristics.

As mentioned previously, the power supply module 250 may provide electrical power to any of a variety of circuits, included electrical components in an LCR configuration. In the exemplary configuration illustrated in FIG. 2, the power supply module 250 may comprise switching power supply circuitry 252 that controls voltage and/or current provided to subsequent circuitry. For example, the exemplary power supply switching circuitry 252 may drive LCR circuitry 260 in a buck configuration (i.e., a voltage step-down configuration). For example, the switches of the switching power supply circuitry 250 may control current flow through an inductor of the LCR circuitry 260 to apply a particular voltage across a parallel capacitor and load. An exemplary transfer function of load voltage to input voltage for the exemplary LCR circuitry 260 may comprise:

$$V_{out}/V_{switch}=1/(s^2LC+sL/R+1).$$

The load of the exemplary LCR circuitry 260 may, for example and without limitation comprise an electrical component, circuit or plurality of circuits that receive electrical power from the power supply module 250 of the circuit 200. The load may, for example and without limitation, comprise any of a large variety of electrical power load devices. For example, the load may comprise passive, active or hybrid components. The load may, for example, comprise integrated circuitry (e.g., a signal processing circuit, a microprocessor, a communication circuit, a user interface circuit, etc.). Accordingly, the scope of various aspects of the present invention should not be limited by characteristics of a particular type of load.

As mentioned previously, in an exemplary circuit configuration that comprises an LCR-type circuit, various components of the LCR circuit may be located in a variety of locations relative to the power supply integrated circuit 200. For example and without limitation, the LCR circuit components may be located external to the power supply integrated circuit 200 (or power supply module 250). Alternatively for example, at least a portion of the LCR circuit components may be located within the integrated circuit power supply 200 (or power supply module 250). Accordingly, the scope of various aspects of the present invention should not be limited by characteristics of a particular location for LCR circuit components nor by the existence or absence of such circuitry.

The exemplary circuit 200 may comprise a power output-monitoring module 270. The power output-monitoring module 270 may, for example and without limitation, share various characteristics with the power output-monitoring module 140 of the exemplary circuit 100 illustrated in FIG. 1 and discussed previously.

The power output-monitoring module 270 may, for example, be communicatively coupled to the output of the power supply module 250. Such communicative coupling may, for example and without limitation, comprise a coupling to circuitry receiving electrical power from the power supply module 250. For example, the exemplary power output-monitoring module 270 illustrated in FIG. 2 is coupled to the Load of the LCR circuit 260. The power output-monitoring module 270 may thus monitor various characteristics of the electrical power output from the power supply module 250 to various electrical components. The power output-monitoring module 270 may, for example, monitor the electrical power output from the power supply module 250 and output a signal indicative of the level (e.g., voltage and/or current level) of the output electrical power 275.

The power output-monitoring module 270 may comprise any of a variety of power monitoring circuitry. For example, the power output-monitoring module 270 may comprise various power, current or voltage monitoring devices. Also for example, in the exemplary circuit 200 illustrated in FIG. 2, the power output-monitoring module 270 comprises a signal scaling circuit (e.g., a voltage divider circuit). In the exemplary circuit 200, as mentioned previously the error determination module 230 receives the power supply reference signal 211 and the signal indicative of the output power level 275. The power output-monitoring module 270 scaling circuitry may scale the signal indicative of the output power level 275 to a scale commensurate (or, e.g., proportionally related to) the scale of the power supply reference signal 211.

In general, the power output-monitoring module 270 may monitor characteristics of the power output from the power supply module 250 in any of a variety of manners, and accordingly, the scope of various aspects of the present invention should not be limited by characteristics of a particular manner of monitoring output power characteristics, particular circuitry for such monitoring, or characteristics of particular signal scaling circuitry.

The exemplary circuit 200 illustrated in FIG. 2 is merely an illustrative circuit shown to provide specific examples of various generally broader aspects of the present invention. Accordingly, the scope of various aspects of the present invention should not be limited by particular characteristics of the exemplary circuit 200.

Figure 6:
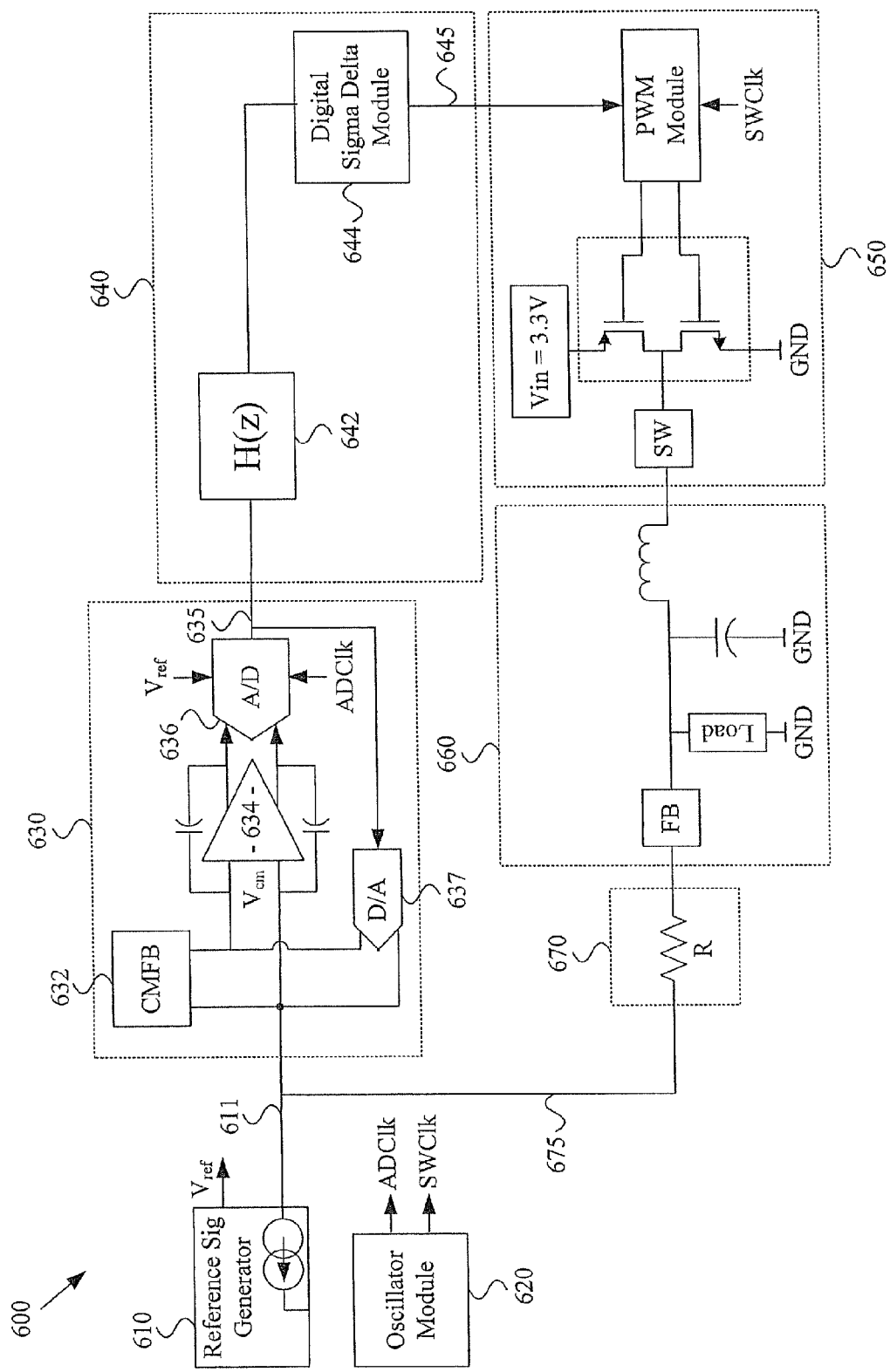
FIG. 6 is a schematic diagram comprising portions of an exemplary power supply integrated circuit, in accordance with various aspects of the present invention.

The exemplary circuit 200 was presented as a non-limiting exemplary illustration where power (e.g., voltage) control was based primarily on difference between an output voltage and a reference voltage, and integration was performed in the analog domain. FIG. 6 provides an alternative exemplary illustration where power (e.g., voltage) control is based primarily on current difference, and integration is performed in the digital domain.

FIG. 6 is a schematic diagram comprising portions of an exemplary power supply integrated circuit 600, in accordance with various aspects of the present invention. The exemplary power supply integrated circuit 600 may, for example and without limitation, share various characteristics with the exemplary power supply integrated circuit 200 illustrated in FIG. 2 and discussed previously. The following discussion will primarily focus on substantial differences between the exemplary power supply integrated circuit 600 and the power supply integrated circuit 200 of FIG. 2 discussed previously.

The previously discussed exemplary power supply IC 200 included a power output-monitoring module 270 for detecting output voltage at point FB and scaling the detected output voltage with a voltage divider circuit. The exemplary power supply IC 600, however, includes a power output-monitoring module 670 that comprises a resistor R that scales current flowing through line 675 (e.g., $I=(V_{FB}-V_{cm})/R$). This current may then be compared to a reference current generated by the reference signal generator 610 (e.g., $I_{ref}=(V_{ref}-V_{cm})/R_{ref}$) to determine an indication of output voltage error (e.g., $V_{ref}-V_{FB}$). Note that R may, in various non-limiting exemplary scenarios, equal $R_{ref}$.

Also, the previously discussed exemplary power supply IC 200 included an error determination module 230, which included an integrator circuit that, in the analog domain, integrated voltage error, which was then digitized and provided to the digital control module 240. The exemplary power supply IC 600, however, includes a common mode feedback regulator 632 that controls the common mode voltage $V_{cm}$ input to the op-amp 634. The output of the op-amp 634 is digitized by the A/D converter 636 and output to the digital control module 640. The digitized op-amp output 635 is also converted to an analog voltage by the D/A converter 637 and input to the op-amp in a feedback loop. During stable steady-state operation, the input voltage at both inputs to the op-amp 635 is $V_{cm}$.

Additionally, the previously discussed exemplary power supply IC 200 included a digital control module 240 comprising a digital filter 242 (e.g., an FIR filter). The digital control module 640 of the exemplary power supply IC 600, however, includes an IIR filter 642. The IIR filter 642 may, for example and without limitation, comprise characteristics of a digital integrator (e.g., an accumulator) characterized by the transfer function $1/(1-z^{-1})$. For example, the previous exemplary power supply IC 200 performed error integration in the analog domain in the error determination module 230, where the exemplary power supply IC 600 performs integration in the digital domain. The output of the digital integrator 642 is then provided to a digital sigma delta module 644, which in turn, outputs a power supply control signal 645 to the power supply module 650.

Note that the boundary of the digital controller module 640 is drawn in FIG. 6 for convenience of comparison between the previously discussed exemplary power supply IC 200 and the exemplary power supply IC 600. The scope of various aspects of the present invention should not be limited by any arbitrary notion of a boundary between various modules. As a non-limiting example, the digital integrator 642 may alternatively be considered to be part of the error determination module 630 instead of the digital control module 640.

The exemplary power supply module 650 and the exemplary LCR circuitry 660 may, for example and without limitation, share various characteristics with the power supply module 250 and LCR circuitry 260 of the exemplary power supply integrated circuit 200 illustrated in FIG. 2 and discussed previously.

The exemplary circuit 600 illustrated in FIG. 6 is merely an illustrative circuit shown to provide specific examples of various generally broader aspects of the present invention. Accordingly, the scope of various aspects of the present invention should not be limited by particular characteristics of the exemplary circuit 600.

Figure 3:
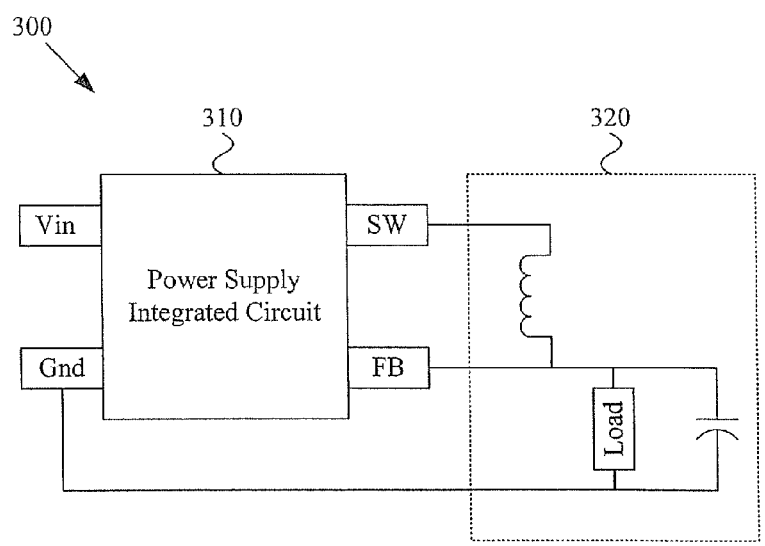
FIG. 3 is a block diagram of an electrical circuit comprising an exemplary power supply integrated circuit, in accordance with various aspects of the present invention.

FIG. 3 is a block diagram of an electrical circuit 300 comprising an exemplary power supply integrated circuit, in accordance with various aspects of the present invention. The exemplary electrical circuit 300 comprises a power supply integrated circuit 310 and an external circuit 320. The exemplary circuit 300 (e.g., the exemplary power supply integrated circuit 310) may, for example and without limitation, share various characteristics with the exemplary integrated circuits 100, 200 and 600 illustrated in FIGS. 1-2 and 6 and discussed previously.

The external circuit 320 may, for example, comprise aspects of the previously discussed LCR circuitry (e.g., LCR circuitry 260 of the exemplary system 200 illustrated in FIG. 2). The external circuit 320 may comprise a Load that receives electrical power from the power supply integrated circuit 310. As discussed previously, the Load may comprise any of a large variety of electrical Load characteristics. For example and without limitation, the Load may comprise any of a variety of passive and/or active electrical components, including but not limited to, a signal processor, a microprocessor, a memory device, a communication circuit, an audio/video circuit, a user interface circuit, etc. Accordingly, the scope of various aspects of the present invention should not be limited by characteristics of a particular Load circuit.

Figure 4:
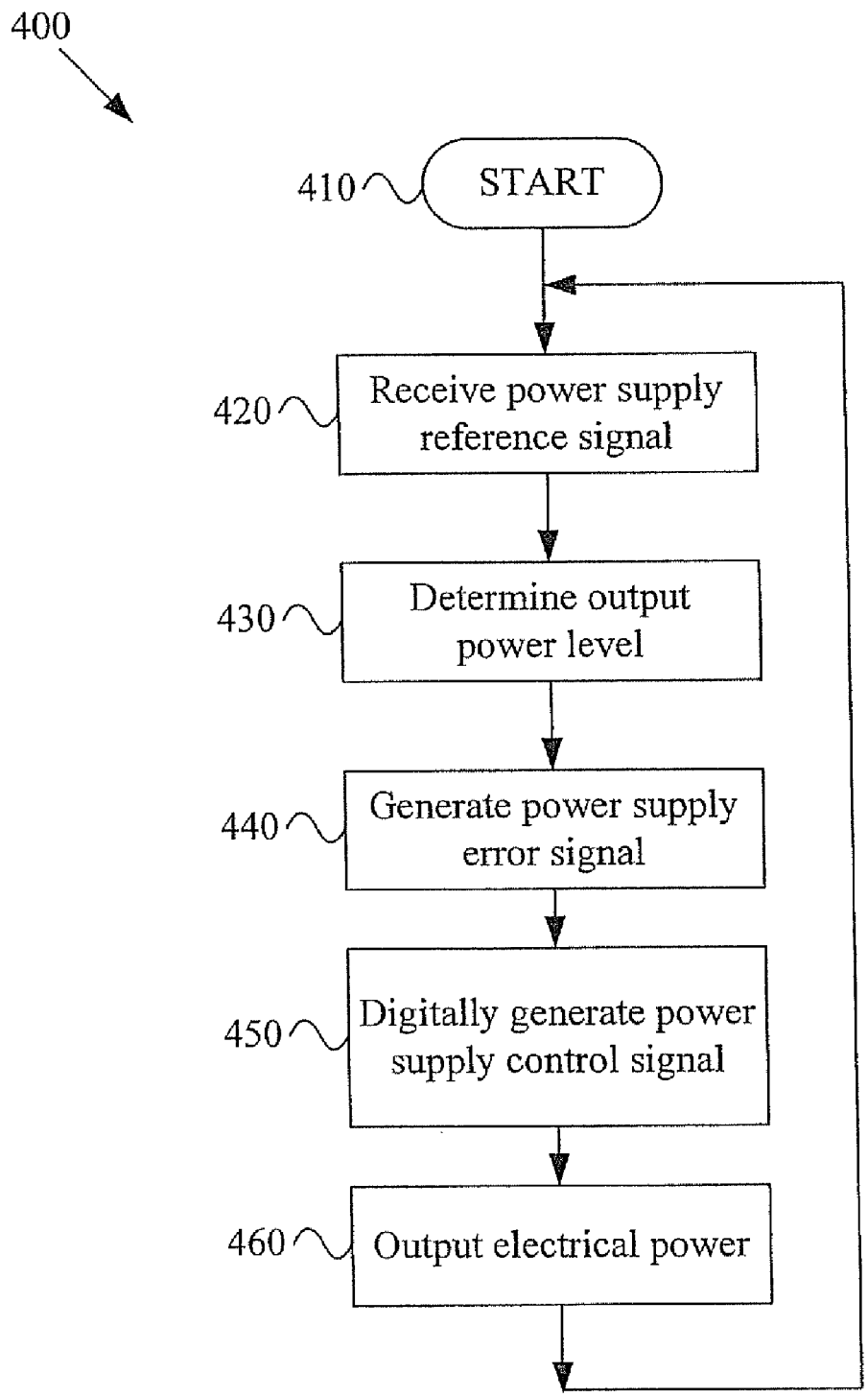
FIG. 4 illustrates an exemplary method for providing electrical power in an integrated circuit, in accordance with various aspects of the present invention.

FIG. 4 illustrates an exemplary method 400 for providing electrical power in an integrated circuit, in accordance with various aspects of the present invention. The exemplary method 400 may share various characteristics with the functionality performed by the exemplary circuits 100-300 illustrated in FIGS. 1-3 and discussed previously.

The method 400 may begin at step 410. The method 400 may begin for any of a large variety of reasons. For example and without limitation, the method 400 may begin in response to a user command. Also for example, the method 400 may begin executing in response to resetting or powering up the integrated circuit. Further for example, the method 400 may execute in response to a request or command from a device external to the integrated circuit or a request or command from a module within the integrated circuit. Accordingly, the scope of various aspects of the present invention should not be limited by causes or conditions that may initiate execution of the exemplary method 400.

The method 400 may, at step 420, comprise receiving a power supply reference signal. Step 420 may, for example and without limitation share various characteristics with the functionality performed by the error determination modules 110, 230 of the exemplary circuits 100, 200 illustrated in FIGS. 1-2 and discussed previously.

The power supply reference signal (or power command signal) may comprise any of a variety of characteristics and may be generated by any of a variety of sources. The power supply reference signal may, for example and without limitation, comprise a voltage and/or current level reference. The power supply reference signal may generally comprise a reference signal related to any of a large variety of electrical power characteristics. The power supply reference signal may, for example, be fixed or variable. Also for example, the power supply reference signal may be analog or digital. Further for example, the power supply reference signal may comprise an absolute or relative reference.

The power supply reference signal may, for example, be generated by a source external to the integrated circuit or may be generated by a source internal to the integrated circuit. The power supply reference signal may, for example, be generated by a constant-signal generating source or may, for example, be generated by a variable-signal generating source (e.g., based on present operating conditions or needs). Accordingly, the scope of various aspects of the present invention should not be limited by characteristics of a particular power supply reference signal or source thereof.

The method 400 may, at step 430, comprise determining the output power level of the electrical power. Step 430 may, for example and without limitation, share various characteristics with the functionality performed by the power output-monitoring modules 140, 270 of the exemplary circuits 100, 200 illustrated in FIGS. 1-2 and discussed previously.

For example and without limitation, step 430 may comprise monitoring various characteristics of electrical power output from the integrated circuit or a module thereof. Step 430 may, for example, comprise monitoring output power level in any of a variety of manners. For example step 430 may comprise monitoring the level of any of a variety of voltage, current, energy or power characteristics. Step 430 may determine such level(s) in any of a large variety of known manners. Accordingly, the scope of various aspects of the present invention should not be limited by characteristics of a particular output power level or manner of determining such an output power level.

Step 430 may, for example, comprise generating a signal indicative of the determined output power level. Such a signal may comprise any of a large variety of signal characteristics. For example and without limitation, such a signal may be analog or digital. Step 430 may, for example, comprise scaling the signal indicative of the determined (e.g., measured) output power level. For example, step 430 may also comprise scaling the signal indicative of the determined output power level such that the scaled signal bears a desired proportional relationship with the power supply reference signal received at step 420.

For example, step 430 may comprise scaling the signal in any of a variety of manners, including utilizing analog and/or digital signal scaling techniques or components. For example and without limitation, in an exemplary scenario where step 430 comprises monitoring voltage level of the output power, step 430 may comprise scaling a signal representative of the monitored voltage level utilizing signal scaling circuitry, such as, for example, voltage dividing or amplifying circuitry to adjust the scale of a signal indicative of the monitored voltage level.

The method 400 may, at step 440, comprise generating a power supply error signal based, at least in part, on a difference between the power supply reference signal (e.g., as received at step 420) and the output power level (e.g., as determined at step 430). Step 440 may, for example and without limitation, share various characteristics with the functionality performed by the error determination modules 110, 230 of the exemplary circuits 100, 200 illustrated in FIGS. 1-2 and discussed previously.

For example and without limitation, step 440 may comprise integrating the difference between the power supply reference signal and the output power level. In an exemplary scenario where step 440 comprises performing integration, step 440 may, for example, perform such integration in the analog and/or digital domain.

Also for example, step 440 may comprise performing multiplication and/or differentiation in determining the power supply error signal. In an exemplary scenario, step 440 may comprise processing the difference between the power supply reference signal and the signal indicative of output power level with a $G_m/C$ integrator circuit. In another exemplary scenario, step 440 may comprise determining the power supply error signal utilizing PID processing of the power supply reference signal and the output power level.

In various exemplary scenarios, step 440 may comprise processing in the analog domain, for example, generating one or more analog signals. In an exemplary scenario, step 440 may comprise generating an analog signal from analog integrator circuitry. In such an exemplary scenario, step 440 may comprise converting from the analog domain to the digital domain. For example and without limitation, step 440 may comprise utilizing an analog-to-digital converter (e.g., a flash) to effect such a signal conversion. In such an exemplary scenario, step 440 may comprise generating the power supply error signal in digital form.

In general, the method 400 may, at step 440, comprise generating a power supply error signal based, at least in part, on a difference between the power supply reference signal (e.g., as received at step 420) and the output power level (e.g., as determined at step 430). Accordingly, the scope of various aspects of the present invention should not be limited by characteristics of a particular manner of generating the power supply error signal or by components (e.g., hardware or software) for effecting such a signal generation.

The method 400 may, at step 450, comprise digitally generating a power supply control signal (e.g., based, at least in part, on the power supply error signal generated at step 440). Step 450 may, for example and without limitation, share various characteristics with the functionality performed by the digital control modules 120, 240 of the exemplary circuits 100, 200 illustrated in FIGS. 1-2 and discussed previously.

Step 450 may, for example, comprise digitally processing the power supply error signal generated at step 440 to generate the power supply control signal. Performing such digital processing may, for example, comprise utilizing any of a variety of known types of digital signal processing. For example step 450 may comprise digitally filtering the power supply error signal or a related signal. Such digital filtering may be implemented in a variety of manners, including software, hardware, or a combination thereof. In an exemplary scenario, step 450 may comprise digitally filtering the power supply error signal with a FIR filter (e.g., a FIR filter characterized by a transfer function $k_1+k_2z^{-1}+k_3z^{-2}$, where the coefficients may be tuned to achieve various scenario-dependent power supply goals).

Step 450 may also comprise processing one or more signals utilizing a digital sigma delta module. A sigma delta module may, for example, process an input signal characterized by a first number of digital bits and output an output signal that is representative of the input signal, where the output signal is characterized by a second number of digital bits (e.g., where the second number of digital bits is less than the first number of digital bits).

In an exemplary scenario, step 450 may comprise digitally filtering a power supply error signal (e.g., as generated at step 440) with a FIR filter, which outputs an intermediate power supply control signal characterized by a first number of digital bits. Step 450 may then, for example, comprise processing the intermediate power supply control signal using a digital sigma delta module to generate a power supply control signal that is representative of the intermediate power supply control signal. The power supply control signal may, for example, be characterized by a second number of digital bits that is less than the first number of digital bits.

As discussed previously, step 450 may comprise generating a power supply control signal. Such a power supply control signal may comprise any of a large variety of control signal characteristics. For example, the power supply control signal may be a digital signal. The power supply control signal may, for example and without limitation, comprise information related to control of power supply switching circuitry. In an exemplary scenario, the power supply control signal may comprise information of a switching duty cycle with which to control power supply switching circuitry. In an exemplary scenario, the power supply control signal may comprise an index or multiplexer control signal that may control selection of a particular switching signal from a set of predetermined switching signals.

In general, step 450 may comprise digitally generating a power supply control signal (e.g., based, at least in part, on the power supply error signal generated at step 440). Accordingly, the scope of various aspects of the present invention should not be limited by characteristics of particular digital control signal processing techniques or by characteristics of a particular power supply error signal or power supply control signal.

The method 400 may, at step 460, comprise outputting the electrical power in accordance with the power supply control signal or a related signal. Step 460 may, for example and without limitation, share various characteristics with the functionality performed by the power supply modules 130, 250 of the exemplary circuits 100, 200 illustrated in FIGS. 1-2 and discussed previously.

For example, step 460 may comprise outputting electrical power at an output power level. Step 460 may, for example, comprise receiving a power supply control signal (e.g., as generated at step 450) or a related signal and outputting the electrical power based, at least in part, on the power supply control signal.

Step 460 may comprise utilizing any of a variety of power supply circuits to output the electrical power. For example and without limitation, step 460 may comprise utilizing switching power supply circuitry. In such an exemplary scenario, step 460 may utilize the power supply control signal to control switching of various devices in the switching power supply circuitry.

In an exemplary scenario where step 460 comprises utilizing switching power supply circuitry, step 460 may also comprise utilizing pulse width modulation to control operation of the switching power supply circuitry. In an exemplary scenario, step 460 may utilize pulse width modulation to control the duty cycle of various power supply circuitry switching devices. For example, step 460 may comprise selecting between a plurality of switching control signals representative of respective duty cycles. In one exemplary scenario, the power supply control signal may comprise information indicating which switching control signal to select. For example and without limitation, in an exemplary scenario where step 460 comprises selecting between 32 distinctive switching control signals representing respective switching duty cycles, the power supply control signal (e.g., as generated at step 450) may comprise six digital bits of information to select between the 32 prospective switching control signals. In one implementation, step 460 may utilize multiplexer hardware or software to implement such a switching control signal selection.

In general, the method 400 may, at step 460, comprise outputting the electrical power in accordance with a power supply control signal or a related signal. Accordingly, the scope of various aspects of the present invention should not be limited by characteristics of a particular power supply control signal, particular power output signal, particular power supply circuitry or particular manner of operating power supply circuitry.

Step 460 may, for example, comprise providing electrical power to any of a large variety of electrical circuits. Such circuits (or portions thereof) may, for example, be internal or external to the integrated circuit. In various exemplary scenarios, step 460 may comprise utilizing power supply switching circuitry to control voltage and/or current provided to LCR circuitry. For example, step 460 may comprise outputting electrical power to LCR circuitry in a buck configuration (i.e., a voltage step-down configuration). For example, step 460 may comprise controlling switches of a switching power supply circuit to control current flow through an inductor to apply a particular voltage across a parallel capacitor and load. Alternatively for example, step 460 may comprise controlling switches of a switching power supply circuit to control voltage and/or current provided to LCR circuitry in a boost configuration (i.e., a voltage step-up configuration).

In general, step 460 may comprise providing electrical power to any of a large variety of electrical circuits. Accordingly, the scope of various aspects of the present invention should not be limited by the existence of, or configuration of, particular circuitry that step 460 may comprise utilizing to output electrical power, or particular circuitry to which step 460 may comprise outputting electrical power.

The exemplary method 400 illustrated in FIG. 4 and discussed previously was presented to provide specific exemplary illustrations of generally broader aspects of the present invention. Accordingly, the scope of various aspects of the present invention should by no means be limited by characteristics of the exemplary method 400.

Figure 5:
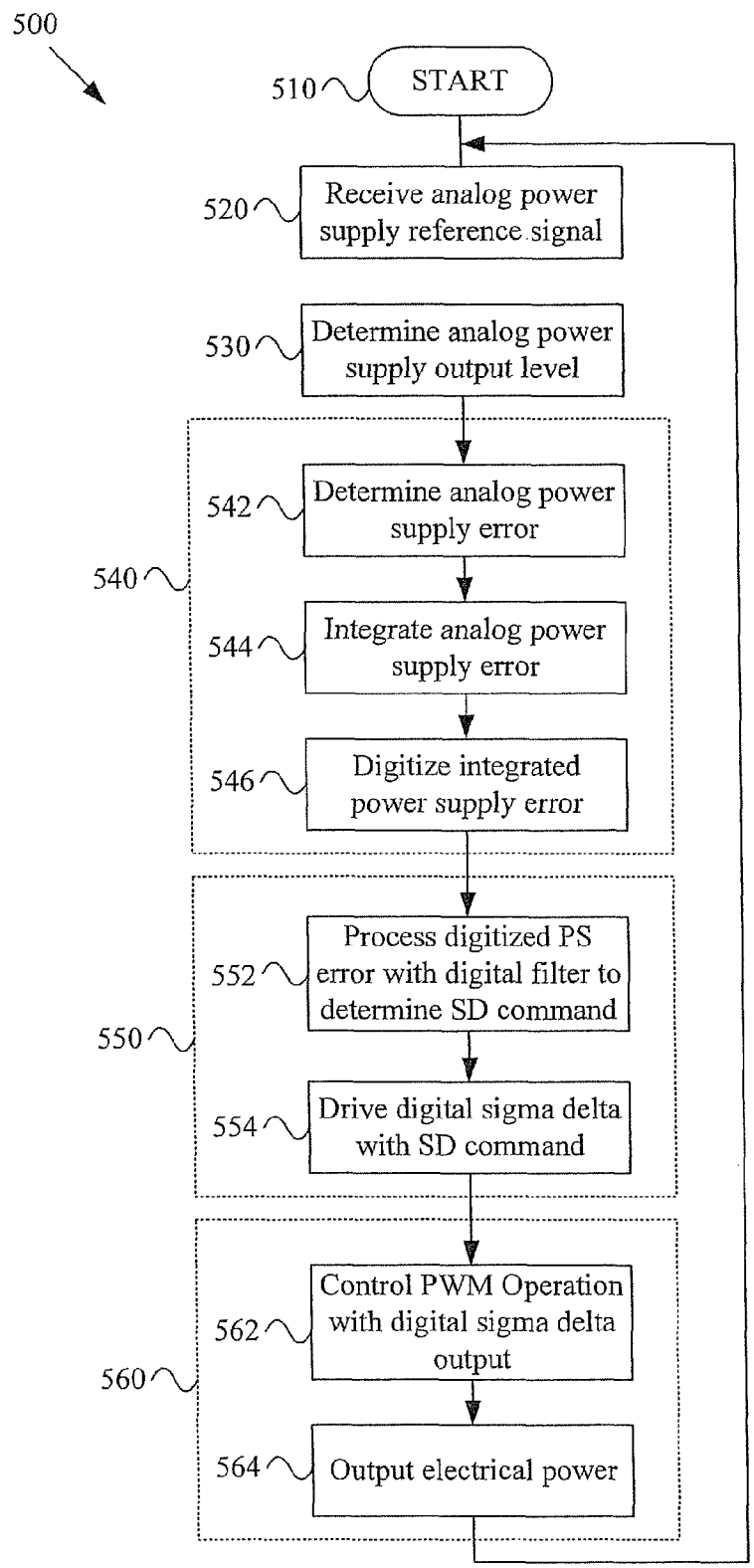
FIG. 5 illustrates an exemplary method for providing electrical power in an integrated circuit, in accordance with various aspects of the present invention.

FIG. 5 illustrates an exemplary method 500 for providing electrical power in an integrated circuit, in accordance with various aspects of the present invention. The exemplary method 500 may, for example and without limitation, share various characteristics with the exemplary method 400 illustrated in FIG. 4 and discussed previously. Further, for example and without limitation, the exemplary method 500 may share various characteristics with the functionality performed by the exemplary circuits 100-300 illustrated in FIGS. 1-3 and discussed previously.

The exemplary method 500 may begin at step 510. Step 510 may, for example and without limitation, share various characteristics with step 410 of the exemplary method 400 illustrated in FIG. 4 and discussed previously.

The exemplary method 500 may, at step 520, comprise receiving a power supply reference signal. Step 520 may, for example and without limitation, share various characteristics with step 420 of the exemplary method 400 illustrated in FIG. 4 and discussed previously. Further for example and without limitation, step 520 may share various characteristics with the functionality performed by the error determination modules 110, 230 of the exemplary systems 100, 200 illustrated in FIGS. 1-2 and discussed previously. For example, in the exemplary method 500 illustrated in FIG. 5, step 520 comprises receiving an analog power supply reference signal.

The exemplary method 500 may, at step 530, comprise determining the output power level of the electrical power. Step 530 may, for example and without limitation, share various characteristics with step 430 of the exemplary method 400 illustrated in FIG. 4 and discussed previously. Further for example and without limitation, step 530 may share various characteristics with the functionality performed by the power supply monitoring modules 140, 270 of the exemplary systems 100, 200 illustrated in FIGS. 1-2 and discussed previously. For example, in the exemplary method 500 illustrated in FIG. 5, step 530 comprises determining an analog power supply output level.

Step 530 may, for example, comprise monitoring output level characteristics of the output power. Step 530 may also, for example, comprise scaling a signal representative of the monitored output level. For example, step 530 may comprise utilizing a scaling circuit (e.g., similar to the voltage divider circuit of the power output-monitoring module 270 illustrated in FIG. 2).

The exemplary method 500 may, at step 540, comprise generating a power supply error signal based, at least in part, on a difference between the power supply reference signal (e.g., as received at step 520) and the output power level (e.g., as determined at step 530). Step 540 may, for example and without limitation, share various characteristics with step 440 of the exemplary method 400 illustrated in FIG. 4 and discussed previously. Further for example and without limitation, step 540 may share various characteristics with the functionality of the error determination modules 110, 230 of the exemplary circuits 100, 200 illustrated in FIGS. 1-2 and discussed previously.

Exemplary step 540 may, at sub-step 542, comprise determining an analog power supply error. Sub-step 542 may, for example, comprise determining a difference between the analog power supply reference signal (e.g., as received at step 520) and the analog power supply output level (e.g., as determined at step 530).

Exemplary step 540 may, at sub-step 544, comprise integrating the analog power supply error (e.g., as determined at sub-step 542). Sub-step 544 may, for example, comprise integrating the analog power supply error utilizing an integrator circuit (e.g., similar to the integrator circuit 234 illustrated in FIG. 2). Such an integrator may, for example, comprise an analog integrator circuit that outputs an analog signal indicative of the integral of the analog power supply error.

Exemplary step 540 may, at sub-step 546, comprise digitizing the integrated power supply error (e.g., as determined at sub-step 544). As discussed previously, in an exemplary scenario, sub-step 544 may comprise generating an analog signal indicative of integrated power supply error. In such an exemplary error, sub-step 546 may comprise digitizing such an analog signal. For example, sub-step 546 may comprise utilizing analog-to-digital converter hardware (e.g., similar to the A/D converter 236 illustrated in FIG. 2) and/or software to perform such digitizing.

The exemplary method 500 may, at step 550, comprise generating a power supply control signal based, at least in part, on the power supply error signal (e.g., as generated at step 540). Step 550 may, for example and without limitation, share various characteristics with step 450 of the exemplary method 400 illustrated in FIG. 4 and discussed previously. Further for example and without limitation, step 550 may share various characteristics with the functionality of the digital controller modules 120, 240 of the exemplary circuits 100, 200 illustrated in FIGS. 1-2 and discussed previously.

Exemplary step 550 may, at sub-step 552, comprise processing digitized power supply error (e.g., as digitized at step 546) with a digital filter to determine a power supply control command. For example, step 550 may comprise processing the digitized power supply error with a FIR filter (e.g., similar to the FIR filter 242 illustrated in FIG. 2). In an exemplary scenario, such an FIR filter may be characterized by a transfer function of $k_1 + k_2 z^{-1} + k_3 z^{-2}$. The coefficients of such a digital filter may be tuned to meet any of a variety of operational goals.

Exemplary step 550 may, at sub-step 554, comprise providing a power supply control command (e.g., as determined at step 552) to a sigma delta module. Sub-step 554 may then comprise processing the power supply control command with the sigma delta module (e.g., similar to the sigma delta module 244 illustrated in FIG. 2). In an exemplary scenario, the power supply control command may be characterized by a first number of digital bits. The sigma delta module may, for example, convert the power supply control command signal to an output power supply control command signal, which is characterized by a second number of digital bits that is less than the first number of digital bits.

The exemplary method 500 may, at step 560, comprise outputting electrical power at an output power level in accordance with the power supply control signal (e.g., as generated at step 550). Step 560 may, for example and without limitation, share various characteristics with step 460 of the exemplary method 400 illustrated in FIG. 4 and discussed previously. Further for example and without limitation, step 560 may share various characteristics with the functionality performed by the power supply modules 130, 250 of the exemplary circuits 100, 200 illustrated in FIGS. 1-2 and discussed previously.

Step 560 may comprise utilizing any of a variety of power supply circuits to output the electrical power. For example and without limitation, step 560 may comprise utilizing switching power supply circuitry. Step 560 may, for example, comprise utilizing pulse width modulation to control such switching power supply circuitry.

Step 560 may, at sub-step 562, comprise controlling operation of a pulse width modulation module (e.g., similar to the pulse width modulation module 254 illustrated in FIG. 2). The power supply control command (e.g., as generated at step 550) may, for example, comprise duty cycle information, which a pulse width modulation module may utilize to determine the duty cycle of switching power supply circuitry command signals.

In an exemplary non-limiting scenario, sub-step 562 may comprise utilizing information in the power supply control command to select from between a finite set of duty cycles. For example, sub-step 562 may utilize multiplexing to perform such a selection.

Step 560 may, at sub-step 564, comprise outputting electrical power. For example, sub-step 564 may comprise controlling switching power supply switches in accordance with pulse width modulation signals developed at sub-step 562. Sub-step 564 may then, for example, comprise providing power to LCR circuitry (e.g., in a buck or boost configuration) to further control the electrical power output. Various components of such exemplary LCR circuitry may be external to the integrated circuit or may be internal to the integrated circuit. From sub-step 564, the execution of the exemplary method 500 may, for example, flow back up to step 520 for continued operation.

The exemplary method 500 illustrated in FIG. 5 and discussed previously was presented to provide specific exemplary illustrations of generally broader aspects of the present invention. Accordingly, the scope of various aspects of the present invention should by no means be limited by characteristics of the exemplary method 500.

It should be noted that various aspects of the present invention may be performed by hardware, a processor executing software instructions, or a combination thereof. It should also be noted that various aspects of the present invention may be performed by one or more electrical devices in various degrees of circuit integration. Accordingly, the scope of various aspects of the present invention should not be limited by characteristics of any particular implementation.

In summary, various aspects of the present invention provide an integrated circuit and method in an integrated circuit for providing electrical power utilizing digital power regulation. While the invention has been described with reference to certain aspects and embodiments, it will be understood by those skilled in the art that various changes may be made and equivalents may be substituted without departing from the

What is claimed is:

1. A power supply integrated circuit comprising:
a first module operable to control electrical power provided to a load, the electrical power characterized by a load voltage level;
a second module operable to receive a power supply reference signal and a signal indicative of the load voltage level and output a power supply error signal, where the power supply error signal is based, at least in part, on the difference between the power supply reference signal and the signal indicative of the load voltage level; and
a third module operable to receive the power supply error signal, digitally process the power supply error signal, and output a power supply control signal that is based, at least in part, on the digitally processed power supply error signal;
where the first module is operable to receive the power supply control signal and control the load voltage level based, at least in part, on the power supply control signal; and
where the third module comprises:
a digital filter operable to output a first signal; and
a sigma delta module, communicatively coupled to the digital filter, that receives the first signal and outputs a second signal representative of the first signal.

2. The power supply integrated circuit of claim 1, wherein:
the first module comprises a power supply module;
the second module comprises an error determination module; and
the third module comprises a digital controller module.

3. The power supply integrated circuit of claim 1, wherein the second signal output from the sigma delta module is the power supply control signal.

4. The power supply integrated circuit of claim 1, wherein the first module comprises a switching power supply circuit.

5. The power supply integrated circuit of claim 1, wherein the first module comprises:
a switching power supply circuit; and
a pulse width modulation module that receives a signal indicative of the power supply control signal and controls operation of the switching power supply circuit based, at least in part, on the signal indicative of the power supply control signal.

6. The power supply integrated circuit of claim 5, wherein the signal indicative of the power supply control signal comprises information of a duty cycle with which the pulse width modulation module is to control operation of the switching power supply circuit.

7. The power supply integrated circuit of claim 1, wherein the first module is coupled to a LCR circuit that is external to the power supply integrated circuit, and the first module provides electrical power to the LCR circuit.

8. The power supply integrated circuit of claim 1, wherein the power supply integrated circuit comprises at least a portion of an LCR circuit that receives electrical power output from the first module.

9. The power supply integrated circuit of claim 1, wherein the second module comprises an integrator circuit, and the power supply error signal is based, at least in part, on an output of the integrator circuit.

10. The power supply integrated circuit of claim 9, wherein the integrator circuit comprises an analog integrator circuit.

11. The power supply integrated circuit of claim 10, wherein the second module comprises an analog-to-digital converter, communicatively coupled to the analog integrator circuit, that outputs the power supply error signal.

12. The power supply integrated circuit of claim 1, wherein the digital filter comprises a FIR filter.

13. The power supply integrated circuit of claim 12, wherein the FIR filter is characterized by the transfer function $k_1+k_2z^{-1}+k_3z^{-2}$.

14. The power supply integrated circuit of claim 1, wherein the digital filter comprises an IIR filter.

15. The power supply integrated circuit of claim 14, wherein the IIR filter is characterized by the transfer function $1/(1-z^{-1})$.

16. The power supply integrated circuit of claim 1, wherein the signal indicative of the load voltage level is a scaled version of the load voltage level.

17. In an integrated circuit, a method for controlling electrical power provided to a load, the electrical power characterized by a load voltage level, the method comprising:
receiving a power supply reference signal;
monitoring the load voltage level;
generating a power supply error signal based, at least in part, on a difference between the received power supply reference signal and the monitored load voltage level;
digitally generating a power supply control signal based, at least in part, on the power supply error signal; and
controlling the electrical power provided to the load in accordance with the power supply control signal;
wherein digitally generating a power supply control signal comprises digitally filtering the power supply error signal to generate a first signal, and sigma delta processing the first signal to generate a second signal representative of the first signal.

18. The method of claim 17, wherein the generated second signal is the power supply control signal.

19. The method of claim 17, wherein controlling the electrical power comprises controlling operation of a switching power supply circuit with the power supply control signal.

20. The method of claim 17, wherein controlling the electrical power comprises:
generating a pulse width modulated signal in accordance with the power supply control signal; and
controlling switching power supply circuitry with the pulse width modulated signal.

21. The method of claim 20, wherein the power supply control signal comprises information of a duty cycle at which the pulse width modulated signal is be generated.

22. The method of claim 17, wherein controlling the electrical power comprises providing electrical power to a LCR circuit that is external to the integrated circuit.

23. The method of claim 17, wherein controlling the electrical power comprises providing electrical power to a LCR circuit, at least a portion of which is internal to the integrated circuit.

24. The method of claim 17, wherein generating a power supply error signal comprises integrating the difference between the received power supply reference signal and a signal indicative of the monitored load voltage level.

25. The method of claim 24, wherein integrating the difference comprises integrating the difference between the received power supply reference signal and the signal indicative of the monitored load voltage level in the analog domain.

26. The method of claim 25, wherein generating a power supply error signal further comprises converting an analog domain signal indicative of the integrated difference to a digital domain signal indicative of the integrated difference.

27. The method of claim 17, wherein digitally generating a power supply control signal comprises finite impulse response filtering the power supply error signal.

28. The method of claim 27, wherein finite impulse response filtering the power supply error signal comprises finite impulse response filtering the power supply error signal in accordance with the transfer function $k_1+k_2z^{-1}+k_3z^{-2}$.

29. The method of claim 17, wherein digitally generating a power supply control signal comprises infinite impulse response filtering the power supply error signal.

30. The method of claim 29, wherein infinite impulse response filtering the power supply error signal comprises infinite impulse response filtering the power supply error signal in accordance with the transfer function $1/1-z^{-1}$.

31. The method of claim 17, wherein monitoring the load voltage level comprises monitoring a signal that is a scaled version of the load voltage level.

32. A power supply integrated circuit comprising:
at least one module operable to, at least:
   receive a power supply control signal;
   control electrical power provided to a load based, at least in part, on the received power supply control signal, the electrical power characterized by a load voltage level;
   receive a power supply reference signal and a signal indicative of the load voltage level and output a power supply error signal, wherein the power supply error signal is based, at least in part, on the difference between the power supply reference signal and the signal indicative of the load voltage level; and
   digitally process the power supply error signal by, at least in part, digitally filtering the power supply error signal and sigma-delta modulating the digitally filtered power supply error signal, and generate the power supply control signal based, at least in part, on the digitally processed power supply error signal.

* * * * *